US006764282B2

(12) United States Patent
Suciu et al.

(10) Patent No.: US 6,764,282 B2
(45) Date of Patent: Jul. 20, 2004

(54) BLADE FOR TURBINE ENGINE

(75) Inventors: Gabriel L. Suciu, Glastonbury, CT (US); Michael Babu, Fairfield, CT (US); James R. Murdock, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/991,149

(22) Filed: Nov. 14, 2001

(65) Prior Publication Data

US 2004/0062651 A1 Apr. 1, 2004

(51) Int. Cl.$^7$ .............................. F01D 5/32; F01D 5/14
(52) U.S. Cl. .............................. 416/220 R; 416/223 A; 416/243
(58) Field of Search ..................... 416/204 A, 219 R, 416/220 R, 223 A, 234, 243, 248

(56) References Cited

U.S. PATENT DOCUMENTS

| | | | | |
|---|---|---|---|---|
| 2,683,583 A | * | 7/1954 | Hiebner, Jr. et al. | 415/220 |
| 2,769,611 A | * | 11/1956 | Schwarzkopf | 416/219 R |
| 2,775,426 A | * | 12/1956 | Barrett, Jr. et al. | 416/219 R |
| 3,323,710 A | | 6/1967 | Daly | |
| 3,661,475 A | * | 5/1972 | Anderson et al. | 416/219 R |
| 4,451,203 A | | 5/1984 | Langley | |
| 4,460,315 A | | 7/1984 | Tseng et al. | |
| 5,007,800 A | | 4/1991 | Hacault et al. | |
| 5,018,941 A | | 5/1991 | Heurtel et al. | |
| 5,022,822 A | | 6/1991 | Sincere | |
| 5,067,876 A | | 11/1991 | Moreman, III | 416/219 R |
| 5,067,877 A | * | 11/1991 | Youssef | 416/220 R |
| RE33,954 E | | 6/1992 | Honda et al. | |
| 5,131,814 A | | 7/1992 | Przytulski et al. | |
| 5,310,318 A | | 5/1994 | Lammas et al. | |
| 5,370,501 A | | 12/1994 | Udall | |
| 5,395,213 A | | 3/1995 | Stenneler | |
| 5,720,596 A | * | 2/1998 | Pepperman | 416/220 R |
| 5,860,787 A | * | 1/1999 | Richards | 416/220 R |
| 5,993,162 A | * | 11/1999 | Weisse et al. | 416/219 R |
| 6,042,333 A | | 3/2000 | Day | |
| 6,155,788 A | | 12/2000 | Beckford et al. | |
| 6,183,202 B1 | * | 2/2001 | Ganshaw | 416/219 R |

* cited by examiner

*Primary Examiner*—Edward K. Look
*Assistant Examiner*—Richard A. Edgar
(74) *Attorney, Agent, or Firm*—Brian J. Hamilla

(57) ABSTRACT

A blade for a turbine engine having a centerline. The blade comprises: a root section extending at an angle relative to the centerline; and an airfoil section extending from the root section. The root section is directly adjacent said airfoil section. In other words, the blade is neckless. The blade is part of a rotor assembly, and is preferably a fan blade.

23 Claims, 10 Drawing Sheets

FIG.6
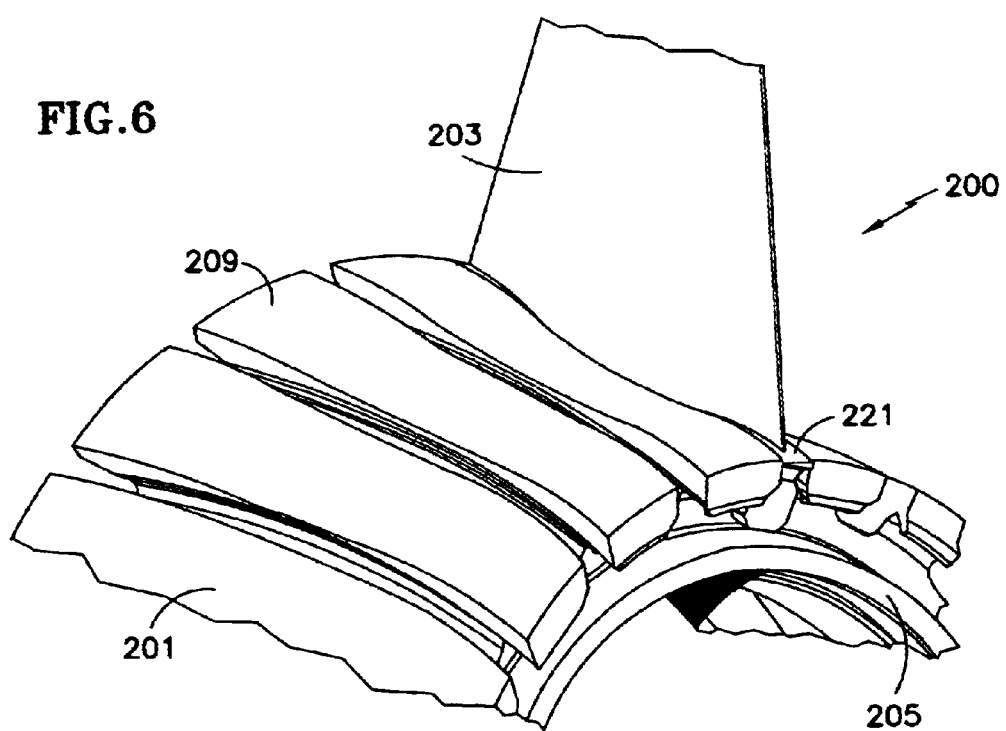
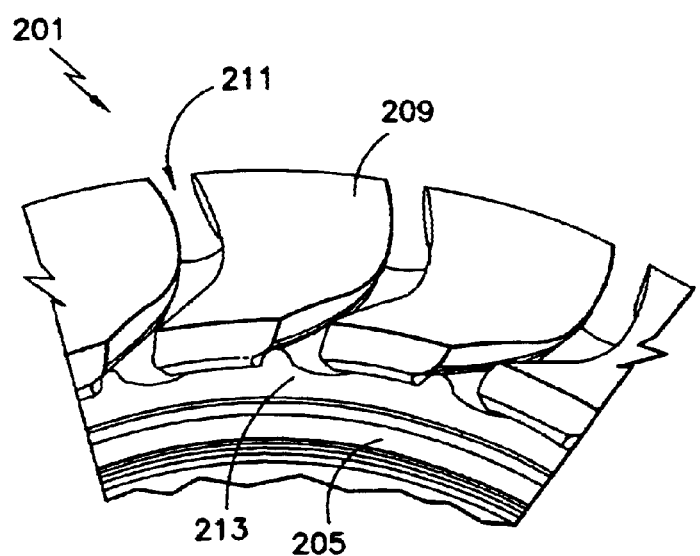
FIG.7

FIG.11b
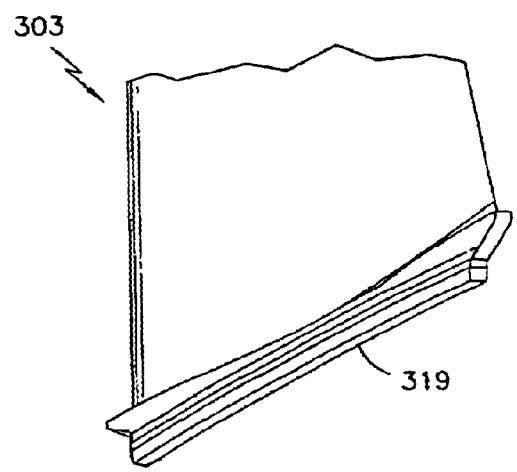
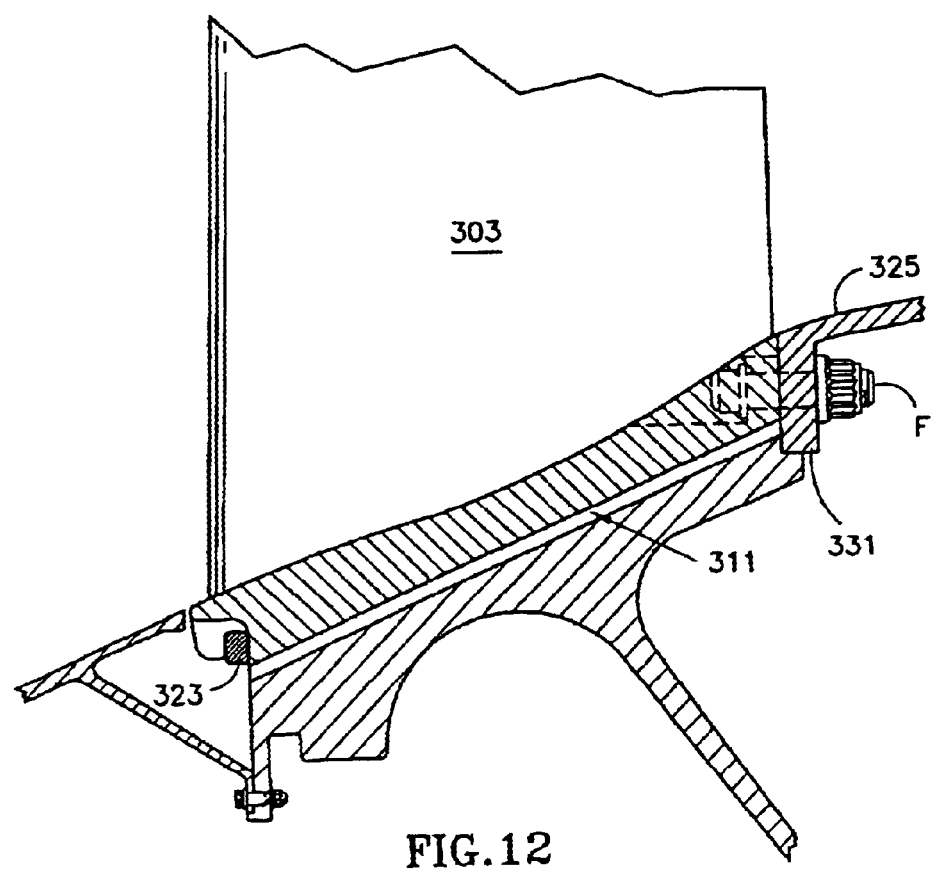
FIG.12

BLADE FOR TURBINE ENGINE

STATEMENT OF GOVERNMENTAL RIGHTS

The U.S. Government may have rights in this invention pursuant to NASA contract NAS3-98005.

TECHNICAL FIELD

This invention relates to a blade for a turbine engine. Specifically, the invention relates to a fan blade for a gas turbofan engine.

BACKGROUND OF THE INVENTION

FIG. 1 provides a cross-sectional view of a gas turbofan engine 50 in a nacelle N. Briefly, air enters an inlet 51 in the nacelle N. A fan section 53 compresses the air entering the inlet 51. The fan section 53 also splits the air into a primary, or core, engine flow C and a secondary, or bypass, flow B. From this point, these flows will travel different paths through the engine.

The core engine flow C enters a compressor section of the engine. Typically, the compressor section includes a low pressure compressor 55 and a high pressure compressor 57. The compressor section increases the pressure of the air to aid in the combustion cycle.

The compressed core engine flow C then enters a diffuser/combustor section 59. The diffuser decreases the velocity of the core engine flow C and further increases pressure. The combustor section 59 mixes the core engine flow C with fuel (not shown) and combusts the mixture.

The gases from the combustor section 59 then enter a turbine section. Typically, the turbine section includes a high pressure turbine 61 connected to the high pressure compressor 57 and a low pressure turbine 63 connected to the low pressure compressor 55 and fan.

After driving the high pressure turbine 61 and the low pressure turbine 63, the core engine flow C exits the engine 50 through a nozzle 65. The core engine flow C through the nozzle 65 produces thrust.

The bypass flow B avoids the core engine. Instead, the bypass flow B travels around the core engine by following the fan section 53 and exiting through a nozzle 67. The bypass flow B through the nozzle 67 also produces thrust. The thrust produced by the bypass flow B in high bypass ratio turbofans can account for a significant portion (e.g. 75 percent) of total engine thrust.

As thrust requirements increase, designers typically increase the diameter of the engine 50. While producing greater thrust, the larger engine adds weight to the aircraft. A portion of the weight increase occurs directly within the engine. For example, the larger engine has larger and heavier fan blades that require, for example, heavier disks, bearings and supports. A portion of the weight increase also occurs indirectly. For instance, larger fan blades require a stronger containment structure to absorb a blade loss. Also, a larger engine requires a stronger pylon on the aircraft and larger struts, flanges, supports and mounts on the nacelle.

Thus, a need exists for keeping weight increases to a minimum. In fact, a preference exists for reducing weight whenever possible.

DISCLOSURE OF THE INVENTION

It is an object of the present invention to reduce engine weight.

It is a further object of the present invention to reduce fan blade weight.

It is a further object of the present invention to reduce the size of the retention structure that secures the fan blade to the disk.

It is a further object of the present invention to reduce the size of the disk.

It is a further object of the present invention to increase mass flow through the fan while keeping engine diameter constant.

It is a further object of the present invention to reduce blade length while keeping mass flow through the fan constant.

It is a further object of the present invention to decrease the kinetic energy of the blade during a blade loss event.

It is a further object of the present invention to reduce the size of the containment structure used to confine a released blade.

It is a further object of the present invention to decrease the unbalanced load on the rotor after a blade loss event.

It is a further object of the present invention to reduce the structural requirements of the engine and aircraft, such as the size of the engine cases, struts, flanges, supports, mounts and engine pylons.

These and other objects of the present invention are achieved in one aspect by a blade for a turbine engine having a centerline. The blade comprises: a root section extending at an angle relative to the centerline; and an airfoil section extending from the root section. The root section is directly adjacent said airfoil section These and other objects of the present invention are achieved in another aspect by a blade for a turbine engine having an axial direction. The blade comprises: an axially oriented root section; and an airfoil section extending from the root section. The blade does not have a neck between the root section and the airfoil section.

These and other objects of the present invention are achieved in another aspect by a rotor assembly for a turbine engine having an axial direction. The rotor assembly includes: a disk having a plurality of axially oriented grooves; and a plurality of neckless blades. Each blade has a root section with a continuous enlarged head for placement within a corresponding groove.

These and other objects of the present invention are achieved in another aspect by a turbofan engine having a flow path. The engine comprises: a fan section; a compressor section; a burner section; a turbine section; and an exhaust section. The fan section includes a disk and a plurality of blades secured thereto. The outer surface of the disk and a portion of the blades define an inner boundary of the flow path.

BRIEF DESCRIPTION OF THE DRAWINGS

Other uses and advantages of the present invention will become apparent to those skilled in the art upon reference to the specification and the drawings, in which:

FIG. 6 is a perspective view of a portion of the rotor assembly of FIG. 4;

FIG. 7 is a perspective view of a portion of the disk used in the rotor assembly of FIG. 4;

FIG. 11b is a rear perspective view of the blade used in the alternative embodiment of the rotor assembly;

FIG. 12 is a cross-section of a portion of a turbine engine incorporating the alternative embodiment of the rotor assembly;

BEST MODE FOR CARRYING OUT THE INVENTION

Figure 1:
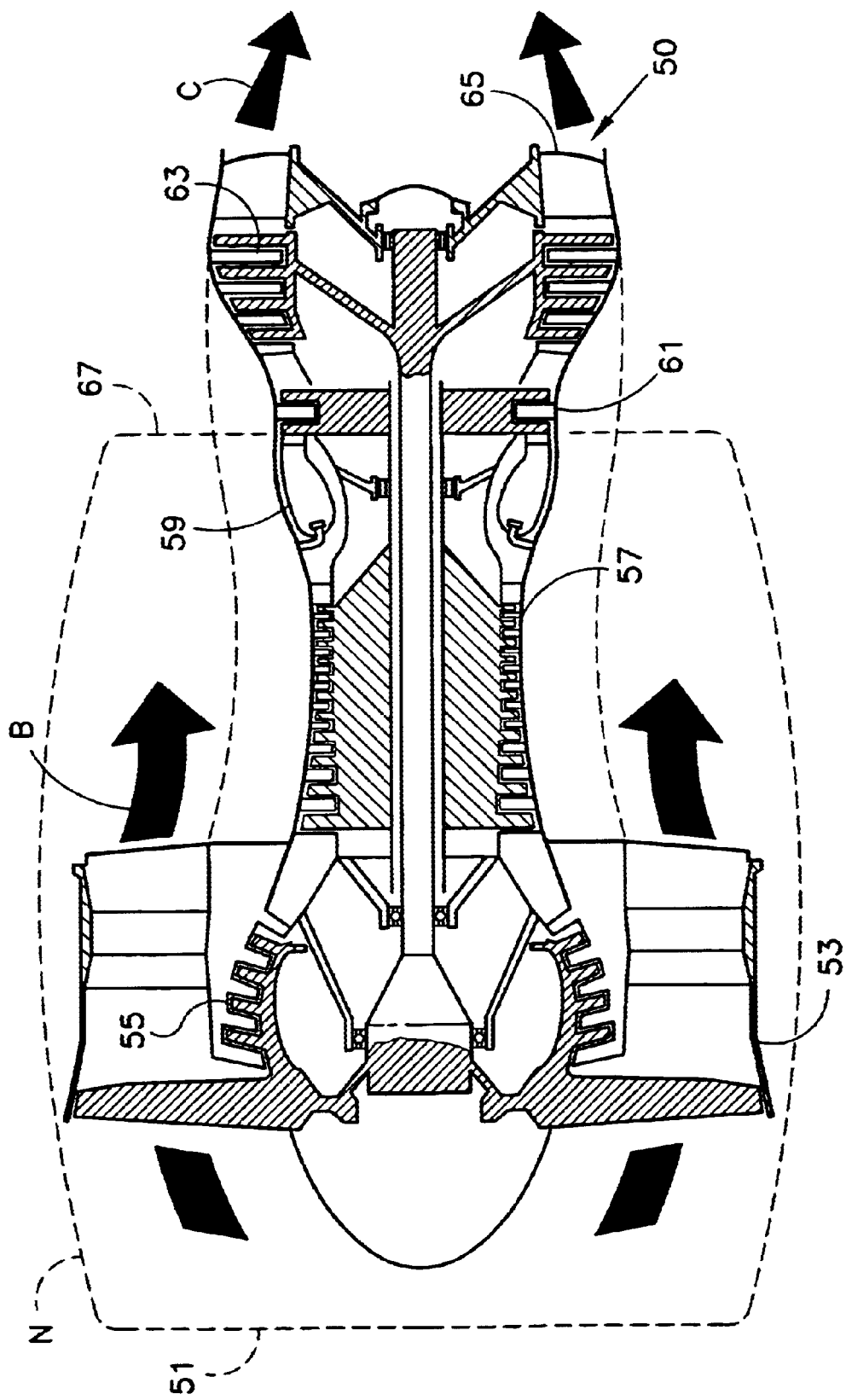
FIG. 1 is a cross-sectional view of a gas turbofan engine.
Figure 2A:
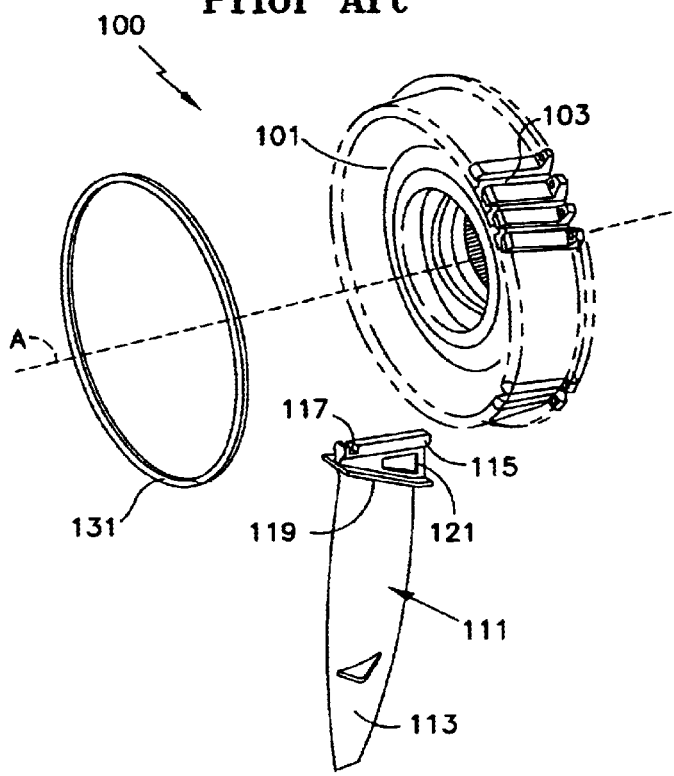
FIG. 2a is a perspective view of a conventional rotor assembly.
Figure 2B:
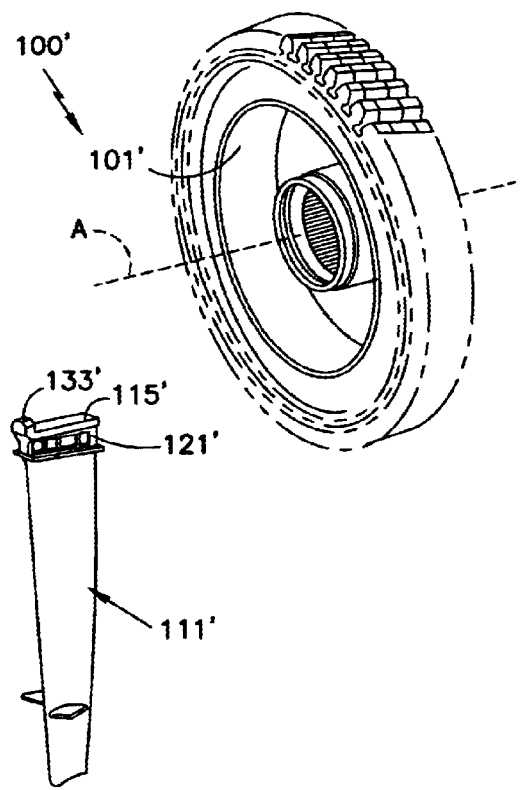
FIG. 2b is a perspective view of another conventional rotor assembly.
Figure 2C:
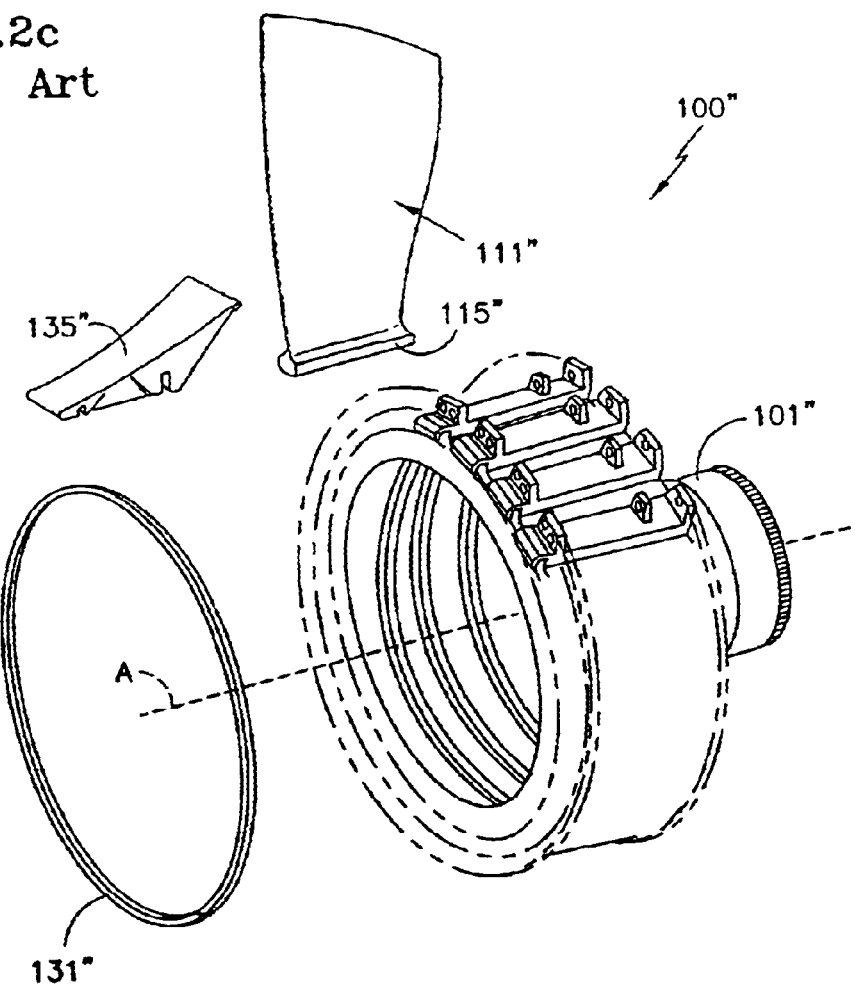
FIG. 2c is a perspective view of another conventional rotor assembly.

FIGS. 2a–c display various conventional rotor assemblies. In FIG. 2a, rotor assembly 100 includes a disk 101 with a plurality of grooves 103. The grooves 103 extend generally parallel to an axial centerline A of the turbine engine. Each groove 103 receives a corresponding blade 111.

The distal, or outer, region of the blade 111 includes an airfoil 113. The proximal, or inner, region of the blade 111 includes a root section having a dove tail 115. In order to engage a corresponding groove 103, the dove tail 115 extends generally parallel to the axial centerline A of the engine. The dove tail 115 also includes a notch 117.

Between the dove tail 115 and the airfoil 113, a platform 119 extends from the blade 111. The platform 119 extends in a radial direction, at an angle to the axial centerline A of the engine. The platform 119 abuts the platforms on adjacent blades. The platforms 119 create the inner boundary for the core engine flow path. A neck 121 resides between the dove tail 115 and the platform 119.

A split lock ring 131 helps secure the blades 111 to the disk 101. After placing the blades 111 in the grooves 103, the split lock ring 131 is placed within the notches 117 of the dove tails 115.

FIG. 2b displays a similar rotor assembly 100' having a disk 101' and blade 111'. Rather than using the notch 117 and split lock ring 131 retention arrangement of FIG. 2a, the dove tail 115' includes a tab 133' that abuts the face of the disk 101'. When a cone segment (not shown) secures to the forward face of the rotor 100', the tab 133' becomes wedged between the rotor 100' and the cone segment.

Similar to the dove tail 115 of FIG. 2a, the dove tail 115' extends generally parallel to the axial centerline A of the engine.

FIG. 2c displays another rotor assembly 100". Similar to the rotor 100, rotor assembly 100" uses a split lock ring 131" to help retain the blades 111" to the disk 101". Differently than the blades in FIGS. 2a and 2b, the blade 111" does not use a platform to define the inner boundary for the core engine flow path. Rather, inserts 135" are placed between adjacent blades 111". The inserts 135" define the inner boundary for the core engine flow path.

Similar to the dove tail 115 of FIG. 2a, the dove tail 115" extends generally parallel to the axial centerline A of the engine.

Figure 3:
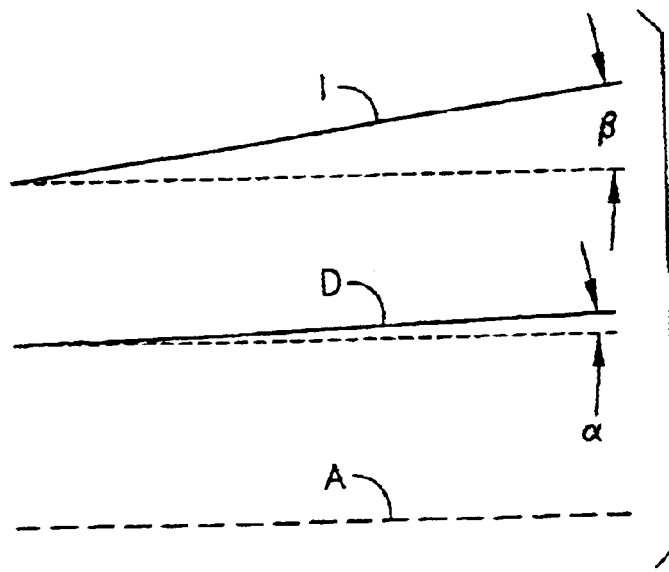
FIG. 3 is a schematic showing the arrangement of various components of a turbine engine using a conventional disk and blade such as those shown in FIGS. 2a–c.

FIG. 3 schematically displays the common features of the conventional rotor assemblies shown in FIGS. 2a–c. In these rotor assemblies, the dovetails 115, 115', 115" extend along a line D generally parallel to the axial direction. Although generally parallel to the axial direction, the dovetails 115 can have a slight radial component. An angle α shows the radial deviation of line D from axial centerline A. Angle α can be range approximately between 0° and 10°.

Also in the aforementioned rotors, the inner boundary of the core engine flow path extends along a line I. Although generally extending in the axial direction, line I also has radial component. An angle β shows the radial deviation of line I from axial centerline A. Angle β can range approximately between approximately 10° and 25°.

As seen from FIG. 3, the difference between the angles of lines I and D can reach approximately 25°. A transition area, or neck, typically occupies the area between the dovetail and inner boundary of the core engine flow path. The neck, however, is not a "working" part of the blade. The neck neither helps retain the blade in the disk nor compresses the core engine flow C. Such a non-working part only adds weight to the engine.

The present invention does not use a transition area or neck. The remaining figures describe various alternative embodiments of the present invention.

Figure 4:
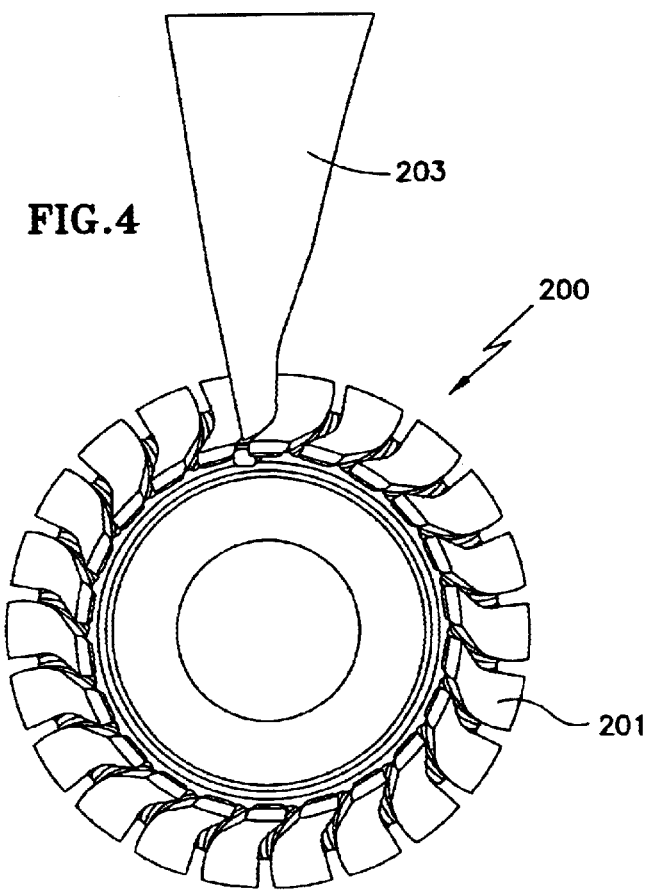
FIG. 4 is a front view of one alternative embodiment of a rotor assembly of the present invention.
Figure 5:
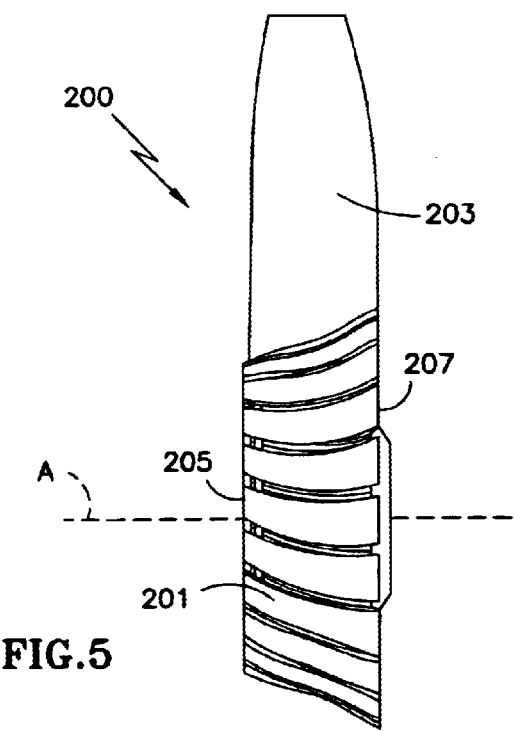
FIG. 5 is a side view of the rotor assembly of FIG. 4.

FIGS. 4–6 display several views of one alternative embodiment of a rotor assembly. The rotor assembly 200 includes a disk 201 and blades 203. FIG. 7 provides a perspective view of a portion of the disk 201.

The disk 201 has an annular shape, with a front face 205, a rear face 207 and an outer surface 209. As clearly seen in FIG. 5, the outer diameter of the disk 201 increases from the front face 205 to the rear face 207. Although the figures (see, e.g., FIG. 9) show the outer surface 209 of the disk 201 following a curvilinear path between the front face 205 and the rear face 207, the outer surface could follow any suitable path, such as rectilinear.

The outer surface 209 substantially defines the inner boundary of core engine flow path. The outer surface 209 has a plurality of grooves 211 generally extending between the front face 205 and the rear face 207. A shoulder 213 exists adjacent the grooves 211 along the front face 205. The grooves 211 define one half of the retention structure that secures the blades 203 to the disk 201.

Figure 9:
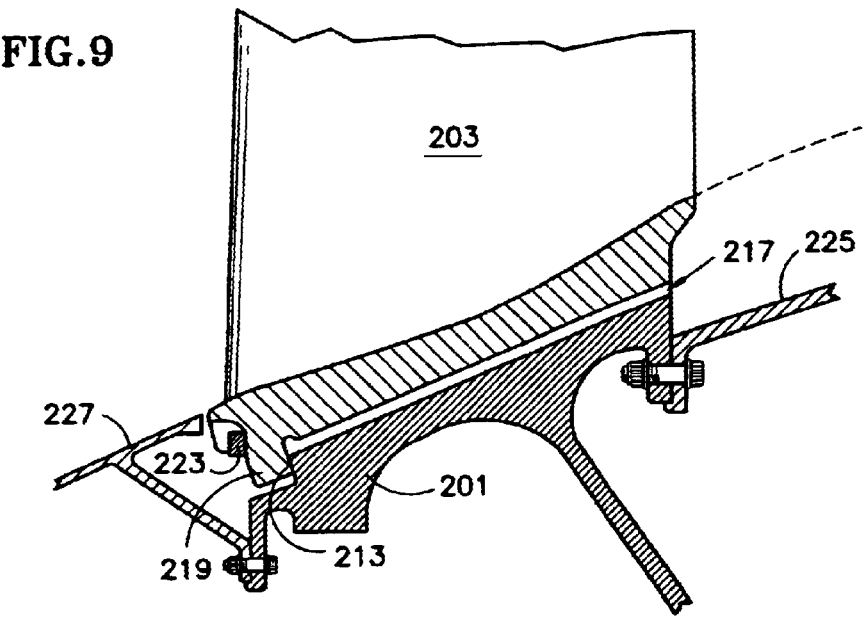
FIG. 9 is a cross-section of a portion of a turbine engine incorporating the rotor assembly of FIG. 4.

As best seen in FIG. 9, the grooves 211 extend at an angle to the axial centerline A. The grooves 211 preferably travel a rectilinear path from the front face 205 to the rear face 207. The grooves 211 generally follow the outer surface 209 of the disk 201. Since the outer surface 209 may follow a curvilinear path, the rectilinear grooves 211 may have localized areas that are slightly non-parallel (e.g. up to approximately 5°).

Figure 8:
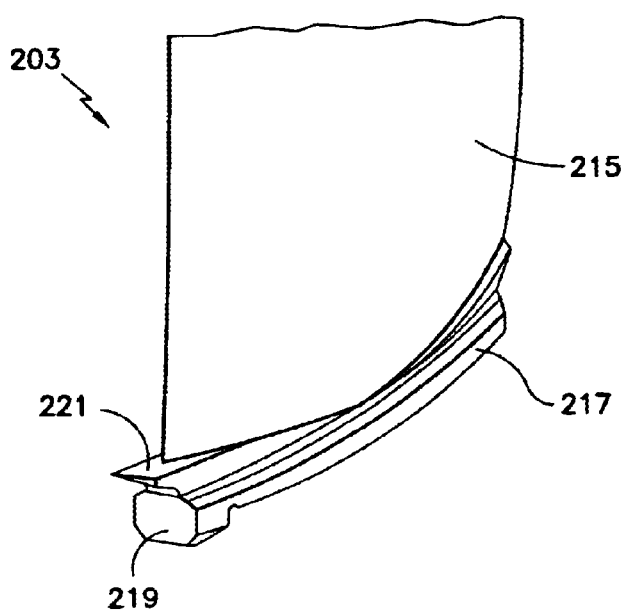
FIG. 8 is a perspective view of a portion of the blade used in the rotor assembly of FIG. 4.

As seen in FIG. 7, the grooves 211 also have an arcuate shape. This accommodates the complex geometry of an airfoil section 215 of the blade. FIG. 8 displays a portion of the blade 203.

The airfoil 215 resides at the distal, or outer, region of the blade 203. The blade 203 also includes a root section having a dovetail 217 for insertion into a corresponding one of the grooves 211. The root section of the blade 203 also includes a tab 219.

The dovetail 217 defines the other half of the retention structure used to secure the blades 203 to the disk 201. Although the figures show the retention structure as the groove 211I/dove tail 217, any other arrangement suitable to secure the blade 203 to the disk 201 could be used. For example, the retention structure could use a fir tree arrangement rather than the dovetail 217.

The blade 203 includes a platform 221 between the root section and the airfoil 215. After installing the blades 203 into the grooves 211 of the disk 201, the platform 221 serves to fill in the gaps. In other words, the platforms 221 define a small portion of the inner boundary of the core engine flow path. As seen in FIG. 6, the platforms 221 are flush with the outer surface 209 of the disk 201.

The platforms 221 of the present invention are narrower than conventional blades. Generally speaking, the platforms 221 are narrower because the outer surface 209 of the disk 201 defines the majority of the inner boundary of the core engine flow path. The blade 203 is considered neckless because the root section of the blade 203 transitions directly into the airfoil section.

FIG. 9 displays the rotor assembly 200 fully installed in an engine. To reach this point, assembly proceeds as follows. The blades 203 are serially placed within the grooves 211 of the disk 201 until the tabs 219 abut the shoulder 213. Then, a split lock ring 223 is placed in a gap formed between the blades 203 and the disk 201 to prevent forward movement of the blades 203. Differently than conventional blades, the tabs 219 of the present invention prevent rearward movement of the blades created by rotation. Rearward movement occurs because the grooves 211 extend in both an axial direction and a radial direction.

The rotor assembly 100 is then secured to a low pressure compressor 225 and a cone segment 227 using conventional techniques.

The use of the present invention has numerous benefits. The primary benefit of using the present invention is reduced fan blade weight. This primary benefit produces numerous other benefits.

First, a lighter fan blade can use smaller retention structure to retain the blade to the disk. A smaller retention structure enables the use of a smaller diameter disk. A smaller diameter disk allows increased mass flow through the fan (assuming constant engine diameter). Alternately, a smaller diameter disk allows decreased engine diameter while providing the same mass flow through the fan.

Second, a lighter fan blade decreases the kinetic energy of the blade during a blade loss event. The lower energy produces enables the reduction in size of the containment structure used to confine the released blade.

Third, a lighter fan blade decreases the unbalanced load on the rotor after a blade loss event. A smaller unbalanced load reduces structural requirements, such as the size of the engine cases, struts, flanges, supports, mounts and engine pylons.

Figure 10:
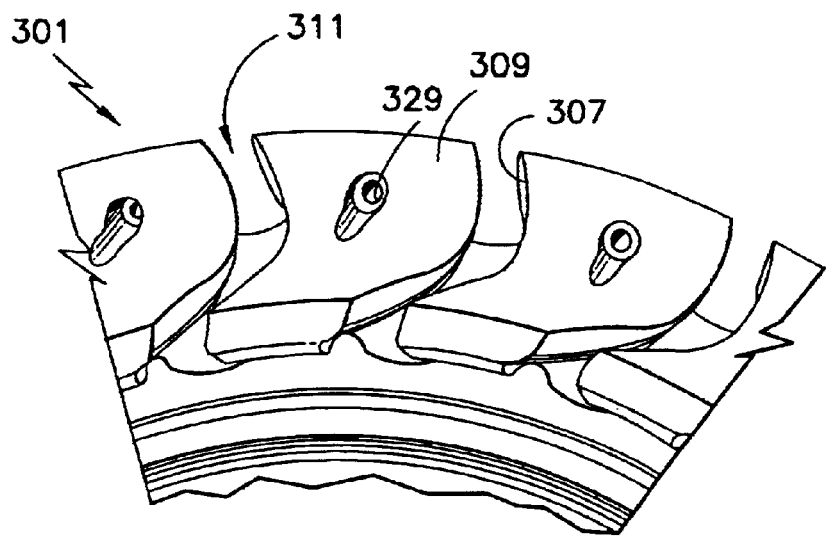
FIG. 10 is a perspective view of a portion of a disk used in an alternative embodiment of the rotor assembly.
Figure 11A:
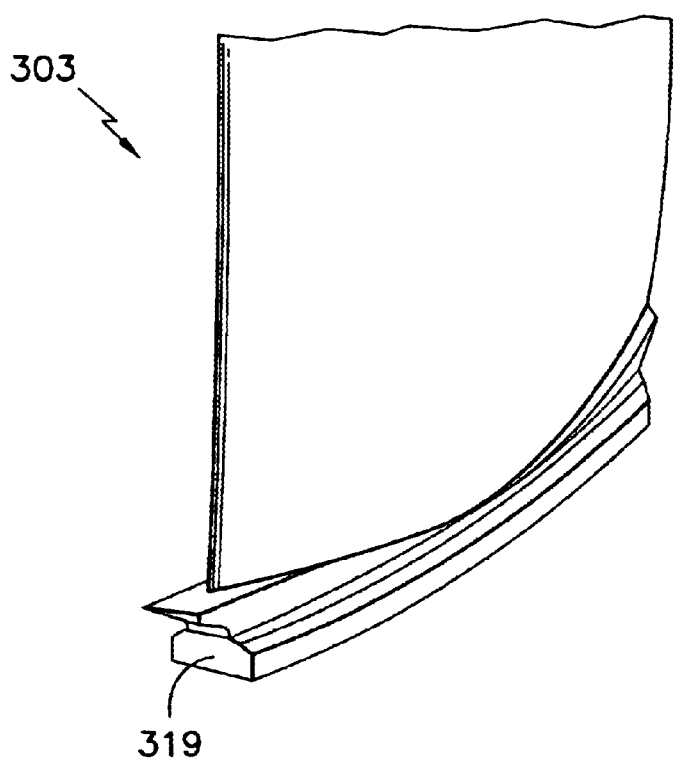
FIG. 11a is a front perspective view of a portion of a blade used in the alternative embodiment of the rotor assembly.

FIGS. 10–12 display another alternative embodiment of the rotor assembly. Since the rotor assembly is similar to rotor assembly 200, only the differences will be discussed. Similar features will use the same reference character, except for a change in the hundreds digit.

FIG. 10 displays a disk 301. The disk 301 has the same features as disk 201. The disk 301, however, includes one additional feature. The disk 301 includes apertures 329 extending between rear face 307 and outer surface 309. The apertures are located between adjacent grooves 311.

FIG. 11 displays a blade 303. The blade 303 has the same features as blade 203, except for the tab 219 on the dovetail 217. Blade 303 merely has a dovetail 319.

FIG. 12 displays the rotor assembly fully installed in an engine. As was described earlier with the rotor assembly 200, the dovetails 319 of the blades 303 are inserted into the grooves 311 of the disk 301. Then, the split lock ring 323 is placed at the front of the rotor assembly in the gap between the disk 301 and the blade 303.

The rotor assembly uses a different retention feature than rotor assembly 200 at the rear end of the rotor assembly. Specifically, the engine uses fasteners F to secure the disk 301 to an annular flange 331 on the low pressure compressor 325. The annular flange 331 extends across the rear of the grooves 311, preventing rearward movement of the blade 303. The fasteners F extend through the apertures 329 in the disk 301. To prevent core engine flow disturbances, the apertures are subsequently filled with a suitable sealant material.

Figure 13:
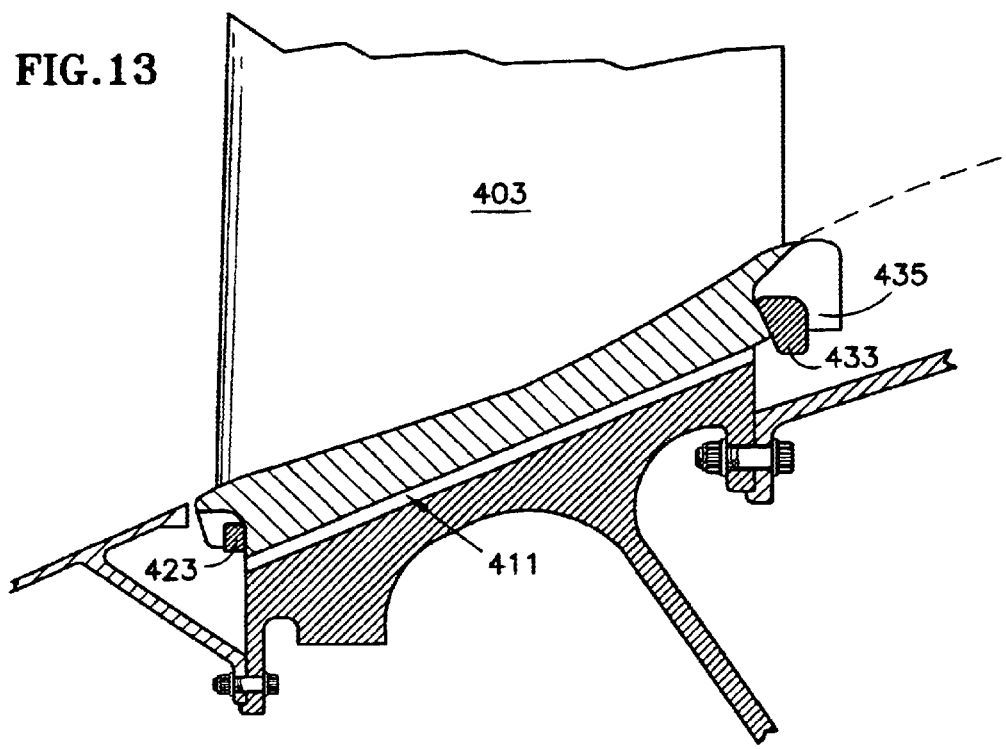
FIG. 13 is a cross-section of a portion of a turbine engine incorporating another alternative embodiment of the rotor assembly.

FIG. 13 displays another alternative embodiment of the rotor assembly. Since the rotor assembly is similar to the aforementioned rotor assemblies, only the differences will be discussed. Similar features will use the same reference character, except for a change in the hundreds digit.

The main difference between this rotor assembly and the other embodiments resides in the rear retention feature. As seen in FIG. 13, the rotor assembly uses a second split lock ring 433. To accommodate the lock ring 433, the rear of the disk 401 includes a plurality of extensions 435 similar to those on the front of the disk 401 used to retain lock ring 423. The extensions 435 flank the grooves 411 and provide a gap between the rear of the disk 401 and the blade 403. The lock ring 433 is placed in the gap to prevent rearward movement of the blades 401.

FIGS. 14–17 display another alternative embodiment of the rotor assembly. Since the rotor assembly is similar to the other rotor assemblies, only the differences will be discussed. Similar features will use the same reference character, except for a change in the hundreds digit.

Figure 15:
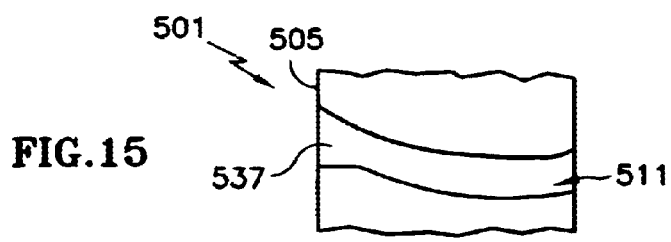
FIG. 15 is a plan view of a portion of a disk used in the rotor assembly of FIG. 14.
Figure 16:
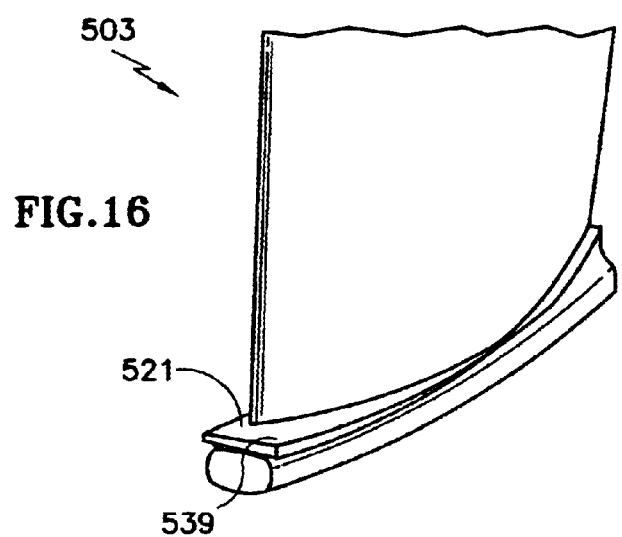
FIG. 16 is a perspective view of a portion of a blade used in the rotor assembly of FIG. 14.

The main difference between this rotor assembly and the other embodiments resides in the retention features. As seen in FIG. 15, the groove 511 in the disk 501 includes an enlarged section 537 adjacent the front face 505. The enlarged section 537 receives an extension 539 on the platform 521 of the blade 503. The platform 521 and the extension 539 create a wedge shape at the front of the blade. FIG. 16 displays the extension 539 on the platform 521.

Figure 14:
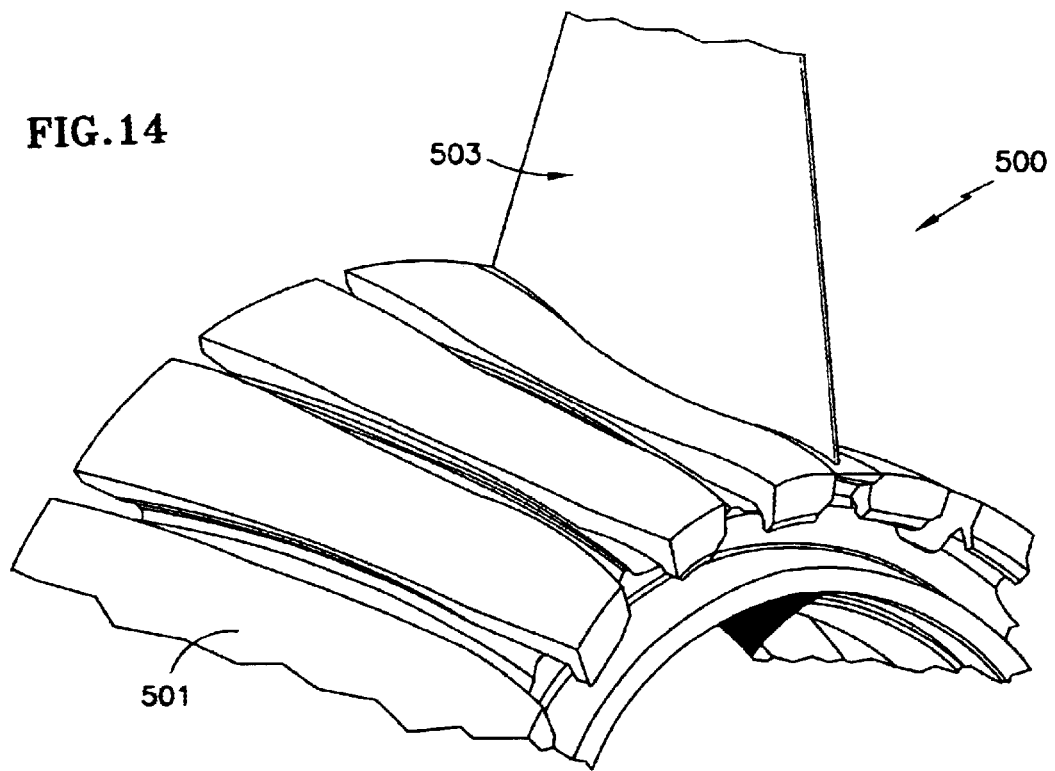
FIG. 14 is a perspective view of another alternative embodiment of the rotor assembly.
Figure 17:
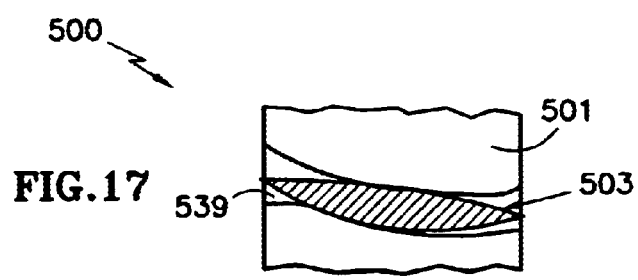
FIG. 17 is a plan view of a portion of the rotor assembly of FIG. 14.

FIGS. 14 and 17 show the blade 503 secured to the disk 501. The wedge-shaped section of the blade 503 abuts the correspondingly shaped enlarged section 537 of the groove 511 in the disk 501. The wedge shape prevents rearward movement of the blade 503. As with the other embodiments, a split lock ring (not shown) placed between the disk 501 and the blade 503 prevents forward movement of the blade 503.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A blade for a turbine engine having a centerline and a flow path, the blade comprising:
   a root section extending at an angle relative to the centerline;
   an airfoil section extending said root section; and
   a platform between said root on and said airfoil section;
   wherein said root section and aid platform follow the flow path.

2. The blade as recited in claim 1, wherein the blade is a fan blade.

3. The blade as recited in claim 1, further comprising a means for preventing rearward movement of the blade when mounted to a disk.

4. The blade as recited in claim 1, wherein said platform has a wedge shape to prevent rearward movement of the blade.

5. The blade as recited in claim 1, wherein said root section is continuous.

6. The blade as recited in claim 5, wherein said root section comprises an enlarged head.

7. The blade as recited in claim 6, wherein said enlarged head has a dovetail or fir-tree shape.

8. A blade for a turbine engine having an axial direction and a flow path, the blade comprising:

an axially oriented root section following the flow path, wherein, at said blade, the flow path extends at an angle to the axial direction;

an airfoil section extending from said root section; and a platform between said root section and said airfoil section, and following the flow path;

wherein said blade does not have a neck between said root section and said airfoil section.

9. The blade as recited in claim 8, wherein the blade is a fan blade.

10. The blade as recited in claim 8, further comprising a means for preventing rearward movement of the blade when mounted to a disk.

11. The blade of claim 8, wherein said platform has a wedge shape to prevent rearward movement of the blade.

12. The blade as recited in claim 8, wherein said root section is continuous.

13. The blade as recited in claim 12, wherein said root section comprises an enlarged head.

14. The blade as recited in claim 13, wherein said enlarged head has a dovetail or fir tree shape.

15. A rotor assembly for a turbine engine having an axial direction and a flow path, comprising:

a disk having a plurality of axially oriented grooves that follow the flow path, wherein, at said disk, the flow path extends at an angle to the axial direction; and a plurality of neckless blades, each having a root section with a continuous enlarged head for placement within a corresponding on of said grooves and a platform;

wherein said root section follows the flow path and said platform defines a boundary of the flow path.

16. The rotor assembly as recited in claim 15, wherein said blades are fan blades.

17. The rotor assembly as recited in claim 15, wherein said enlarged head has a dovetail or fir tree shape.

18. The rotor assembly as recited in claim 15, further comprising a means for preventing rearward movement of said blade when mounted to said disk.

19. The rotor assembly of claim 15, further comprising a lock ring upstream of said blades and a lock ring downstream of said blades to secure said blades to said disk.

20. The rotor assembly of claim 15, wherein said disk includes apertures therein, within the flow path, for securing said disk to a flange of a downstream component.

21. A turbofan engine having a centerline and a flow path, comprising:

a fan section having a disk ant a plurality of blades secured thereto;

a compressor section;

a burner section;

a turbine section; and an exhaust section;

wherein an outer surface of std disk and platforms on said blades define an inner boundary of the flow path, the flow path extending at an angle relative to the centerline.

22. The engine as recited in claim 21, wherein said platforms are flush with said outer surface of said disk.

23. The engine as recited in claim 21, wherein said blades each have a retention section received within a corresponding groove in said disk, said retention section extending parallel to said inner boundary of said flow path.

* * * * *

UNITED STATES PATENT AND TRADEMARK OFFICE
CERTIFICATE OF CORRECTION

PATENT NO. : 6,764,282 B2
DATED : July 20, 2004
INVENTOR(S) : Gabriel L. Suciu et al.

It is certified that error appears in the above-identified patent and that said Letters Patent is hereby corrected as shown below:

Column 6,
Line 59, after "extending" insert -- from --
Line 60, delete "on" and insert -- section --
Line 61, delete "aid" and insert -- said --

Column 8,
Line 3, delete "on" and insert -- one --

Signed and Sealed this

Fifth Day of April, 2005

JON W. DUDAS
*Director of the United States Patent and Trademark Office*